United States Patent

[11] 4,054,341
[45] Oct. 18, 1977

Spieth

[54] ADJUSTABLE LOW FRICTION BEARING

[76] Inventor: Rudolf Spieth, Kennenburger Strasse 42, D 7300 Esslingen (Neckar) Kennenburg, Germany

[21] Appl. No.: 729,071

[22] Filed: Oct. 4, 1976

[30] Foreign Application Priority Data

Oct. 4, 1975 Germany .......................... 2544497

[51] Int. Cl.² .......................................... F16C 17/00
[52] U.S. Cl. .......................................... 308/237 R
[58] Field of Search ............... 308/36, 15, 31, 237 R, 308/237 A, 239

[56] References Cited

U.S. PATENT DOCUMENTS 3,606,501 9/1971 Waplington .......................... 308/35
3,759,588 9/1973 Anderson .......................... 308/35

Primary Examiner—Richard A. Bertsch
Attorney, Agent, or Firm—Roylance, Abrams, Berdo & Kaul

[57] ABSTRACT

A bearing and clamping bushing is integrally formed with end rings and a central section which changes diameter when the end rings are clamped together. Annular grooves separate the central section from the end rings and form flexible bridges. Axially extending slits in the central portion permit the diameter change and provide lubrication paths.

8 Claims, 3 Drawing Figures

ADJUSTABLE LOW FRICTION BEARING

This invention relates to a low friction bearing and, more specifically, to a low friction bearing the diameter of which is adjustable.

BACKGROUND OF THE INVENTION

It is known to provide a low friction bearing of the general type described herein in which a clamping bushing accommodates a bearing bushing, secure against rotation, the bearing bushing having on its outside surface radially projecting, axially extending ribs, whereby the ribs of the bearing bushing alone fit against the clamping bushing. The apparatus is provided with clamping elements, and the number of clamping elements is the same as the number of ribs with one clamping element and one rib always being disposed essentially in one common radial plane, this plane containing the longitudinal axis of the assembly. An example of this form of structure is shown in German Pat. No. 1,625,621.

It is also known to provide an antifriction bearing with a raceway, this bearing having two annular recesses open on the side facing away from the roll bodies and two annular recesses disposed on both sides thereof and open in the direction of the roll bodies wherein the recesses opening in the direction toward the roll bodies lie outside of the running surfaces of the roll bodies. Axially disposed clamping members serve for tensioning the raceway. The part of the raceway which is located between the two annular recesses facing away from the roll bodies is free of annular recesses and forms a massive ring, disposed on the side facing away from the roll bodies, in the area of the running surface. That ring has radial slits, running parallel to its axis and running in equal peripheral distances on the side facing away from the roll bodies, which slits extend between the recesses disposed on both sides of the reinforcing body and to about their depth. The slits are penetrated by clamping screws. An example of this is found in German Offenlegungsschriften No. 2,310,511.

SUMMARY OF THE INVENTION

An object of the present invention is to provide a low friction bearing of the type first described above wherein a bearing bushing forming a separate special body is omitted. The omission of the special separate bearing bushing leads to a simple and cheap construction of the low friction bearing. While in the case of known antifriction bearings an even change of the diameter of the raceway is to be achieved by tightening of the clamping screws, in case of the friction bearing wedge-shaped bearing slits are striven for which facilitate the formation of a grease cushion.

Briefly described, the present invention includes a slide bearing with a clamping bushing of which the diameter is variable in response to axial compression to change the bearing play comprising a cylindrical body having inner and outer generally cylindrical surfaces, one of those surfaces constituting an integrally formed bearing surface for the bushing, means defining first and second pairs of annular circularly extending grooves in the body, the pairs of grooves being axially spaced apart to separate the body into first and second annular end portions and an annular central portion, the endmost one of each of said pairs of grooves extending radially into said body from said bearing surface, said pairs of grooves forming spring-like bridge portions interconnecting said end portions and said central portion, a plurality of clamping means extending axially between said end portions and through openings in said central portion for engaging said end portions and urging them toward each other, said clamping means being circularly evenly spaced apart and being located at about the radial midpoints of said end portions, means in said central portion for defining a plurality of axially extending slits extending into said central portion from the one of said surfaces opposite the bearing surface to form axially extending hinge zones in said central portion, said plurality of slits including a first group of slits adjacent to and intersecting the openings in said central portion for said clamping means, and a second group circularly offset from said first group, whereby axial compression of said body causes radial deformation of said central portion to adjust the effective diameter of the bushing.

In order that the manner in which the foregoing and other objects are attained in accordance with the invention can be understood in detail, a particularly advantageous embodiment thereof will be described with reference to the accompanying drawings, which form a part of this specification, and wherein.

Figure 1:
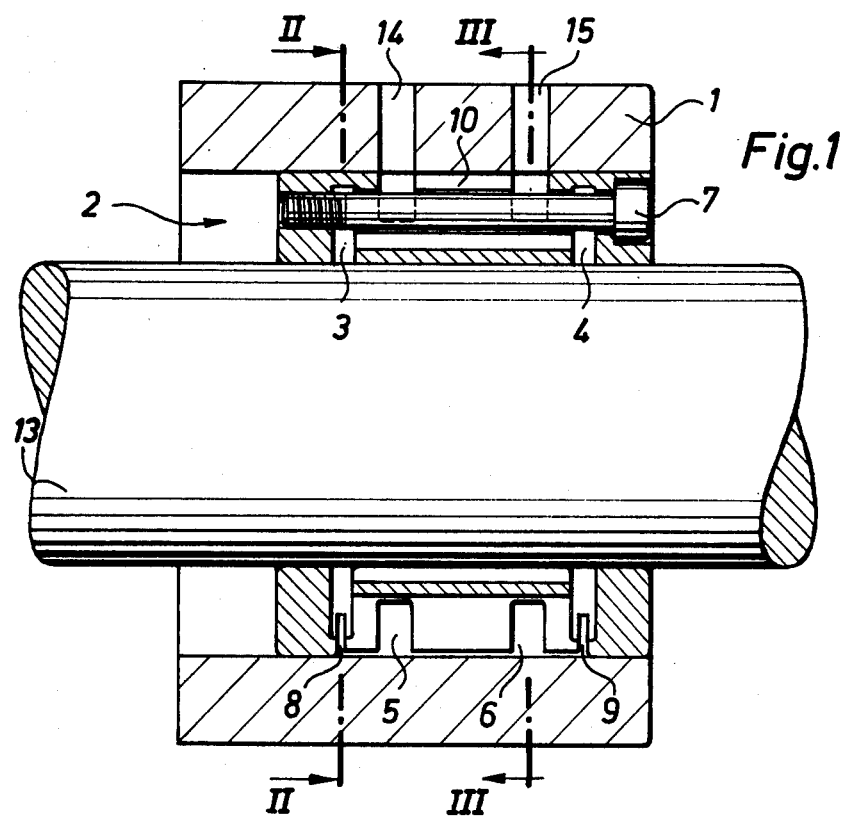
FIG. 1 is a side elevation, in partial section, of an apparatus according to the invention along lines I—I of FIG. 2.
Figure 3:
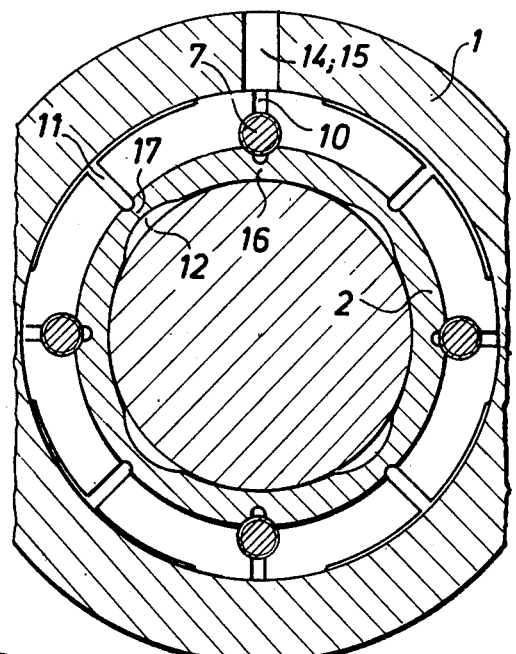
FIG. 3 is an end elevation, in section, along lines III—III of FIG. 1.
Figure 2:
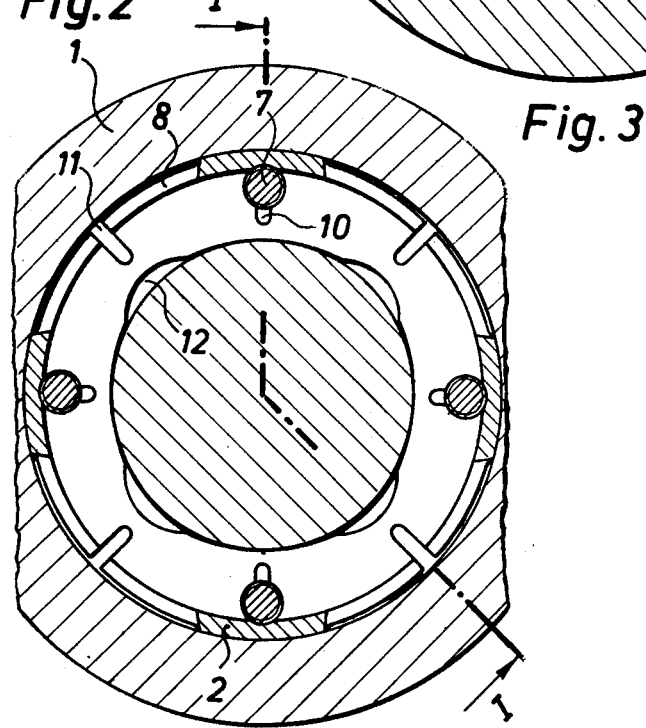
FIG. 2 is an end elevation, in section, along lines II—II of FIG. 1.

In the embodiment shown in FIGS. 1-3, there is provided a bearing housing 1 which is a right circular cylindrical body having a cylindrical bore therethrough to receive a clamping bushing indicated generally at 2. In longitudinal cross-section it will be seen that the clamping bushing is developed having a rather sinuous cross-section formed by axially spaced annular grooves 3, 4, 5 and 6. The bushing has a generally cylindrical outer surface and a cylindrical inner surface with bores 3 and 4 extending radially outwardly from the inner surface and bores 5 and 6 extending radially inwardly from the outer surface. The inner surface of bushing 2 constitutes the bearing surface in this embodiment and grooves 3 and 4 which extend outwardly from this surface are disposed closest to the end portions of the bushing with inwardly extending grooves 5 and 6 extending inwardly from the outer surface adjacent housing 1. The grooves can be regarded as being provided in pairs with the pair including grooves 3 and 5 defining spring-like bridge portions between the left-hand annular end ring and the central portion and the pair including grooves 6 and 4 defining similar spring-like bridge portions between the central portion and the other end ring. A plurality of clamping members 7 extend axially through the central portion and through the right-hand end portion and threadedly engage the left-hand end portion, the enlarged heads of the clamping members being seated in countersunk holes in the right-hand end ring. Four such clamping screws are shown, these being disposed at 90° intervals and being located at approximately the radial midline of the bushing with respect to the central axis thereof. The clamping screws pass through openings in the central portion, the openings being larger than the screws so that there is clearance around the central portion of each of the screws.

The outer surface of the clamping bushing is also provided with slits 8 and 9 which extend circularly or peripherally around this outer surface. As best seen in FIG. 2, the slits 8 and 9 are not continuous. Instead, they extend over angular distances of approximately 60°, this 60° sector being disposed so that it is centered between clamping screws, leaving bridge portions between the end rings and the central portions which form the spring-like interconnections between the end rings and the central portion. These spring-like portions permit the central portion to expand radially when the end rings are urged toward each other by tightening of the clamping screws.

The clamping bushing 2, which is developed as a hollow cylinder, is also provided with a plurality of longitudinal slits 10 and 11, these slits extending radially inwardly from the outer surface of the bushing, slits 10 being aligned with and in the same radial planes as clamping screws 7 and slits 11 being disposed midway between the clamping screws. Thus, it will be seen that the set of four slits 11 is offset from slits 10 by about 45°. A third set of slits or axial recesses 12 is formed on the inner surface of bushing 2, the slits or troughs 12 being angularly disposed so that they are aligned with slits 11 and lie in radial planes extending through the central axis of the bushing. All of slits 10–12 extend parallel to the central axis of the bushing. The troughs 12 are somewhat wider and shallower than slits 10 and 11, troughs 12 being in the order of 0.2 times the radial thickness of clamping bushing 2. As seen in FIG. 3, longitudinal slits 10 and 11, in conjunction with troughs 12, form axially extending bridge portions 16 and 17, of approximately equal thickness, which remain. Longitudinal slits 10 extend between annular grooves or recesses 5 and 6, and slits 11 and 12 extend between annular recesses 3 and 4. As a result of this forming of thinned portions 16 and 17, there is provided a series of bridge portions permitting a kind of articulation of the central portion of the clamping bushing along lines which are parallel to the central axis of the bushing. With the exception of troughs 12 and annular recesses 3 and 4, the inner surface of clamping bushing 2 is a right circular cylinder and is dimensioned to receive a circular shaft 13 passing therethrough.

Clamping bushing 2 can consist of a bearing material such as bronze, or it can be formed of steel and then provided on its inner surface with a layer or coating of a bearing material such as bronze or a plastic material or the like, which can be sprayed on.

Whenever the clamping screws 7 are tightened, the end rings of the bushing are drawn toward each other and the clamping bushing 2 expands, in a radial direction, because of the obliquity of the supporting rings present always between the annular recesses 3 and 5 and 4 and 6, until the clamping bushing 2 fits against bearing housing 1. When the clamping screws 7 are tightened further, the parts of the clamping bushing between annular recesses 3 and 4 are pressed radially inwardly and the portions of the clamping bushing 2 between adjacent ones of the longitudinal slits 11 and trough 12 and between annular recesses 3 and 4 are pressed radially outwardly in the areas of the clamping grooves 7. Except in the regions of the troughs 12, and because of the otherwise uniform inside diameter in the untensioned state, the smallest bearing play is in the area of the clamping screws 7 and the greatest bearing play is in the area of the longitudinal slits 11. In that way, lubricating pockets, which always narrow down toward the clamping screws, are formed, so that no difference results from the direction of rotation of shaft 13.

In order to supply the bearing having the clamping bushing 2 with lubricant, lubricating channels 14 and 15 are disposed radially in bearing housing 1, these channels being connected to annular recesses 5 and 6. Lubricant can pass from recesses 5 and 6 through the axial openings into slits 8 and 9 and thus through annular recesses 3 and 4 into the region of troughs 12, thus assuring a supply of lubricant to the bearing surfaces.

It is possible to attach the clamping bushing on shaft 13 and to thus provide the bearing surface on the outside periphery of the clamping bushing. In a structure of this type, the arrangement of the annular recesses is exactly reversed from that shown in the drawings. Thus, the troughs would be provided on the exterior surface and the relationship of annular recesses is reversed with the outer recesses being closest to the end rings and the radially outwardly extending recesses being inwardly disposed thereof.

While one advantageous embodiment has been chosen to illustrate the invention, it will be understood by those skilled in the art that various changes and modifications can be made therein without departing from the scope of the invention as defined in the appended claims.

What I claim is:

1. A slide bearing with a clamping bushing of which the diameter is variable in response to axial compression to change the bearing play comprising a cylindrical body having inner and outer generally cylindrical surfaces, one of said surfaces constituting an integrally formed bearing surface for the bushing;

means defining first and second pairs of annular circularly extending grooves in said body, said pairs of grooves being axially spaced apart to separate the body into first and second annular end portions and an annular central portion, the endmost one of each of said pairs of grooves extending radially into said body from said bearing surface, said pairs of grooves forming spring-like bridge portions interconnecting said end portions and said central portion;

a plurality of clamping means extending axially between said end portions and through openings in said central portion for engaging said end portions and urging them toward each other, said clamping means being circularly evenly spaced apart and being located at about the radial midpoints of said end portions;

means in said central portion for defining a plurality of axially extending slits extending into said central portion from the one of said surfaces opposite the bearing surface to form axially extending hinge zones in said central portion, said plurality of slits including a first group of slits adjacent to and intersecting the openings in said central portion for said clamping means, and a second group circularly offset from said first group, whereby axial compression of said body causes radial deformation of said central portion to adjust the effective diameter of said bushing.

2. A bearing according to claim 1 wherein said axially extending slits extend radially into said body.

3. A bearing according to claim 2 and further comprising
means defining a third group of axial slits extending radially into said central portion from said bearing surface, the slits in said third group each being in the shape of a shallow trough and being symmetrical with respect to a radial line passing through the center thereof.

4. A bearing according to claim 3 wherein each of said slits in said third group is radially aligned with one of the slits of said second group, the slits of said third group being significantly wider and shallower than the slits of said second group.

5. A bearing according to claim 1 wherein said bearing surface is coated with bronze.

6. A bearing according to claim 1 wherein said body is formed of bronze.

7. A bearing according to claim 1 wherein said bearing surface is coated with a low friction plastic material.

8. A bearing according to claim 1 wherein said body is formed of steel and wherein said bearing surface is coated with a plastic material.

* * * * *